Jan. 4, 1927.                A. ZIMMERLI                1,613,073
                      SOLVENT RECOVERY APPARATUS
                   Filed Dec. 17, 1923      2 Sheets-Sheet 1
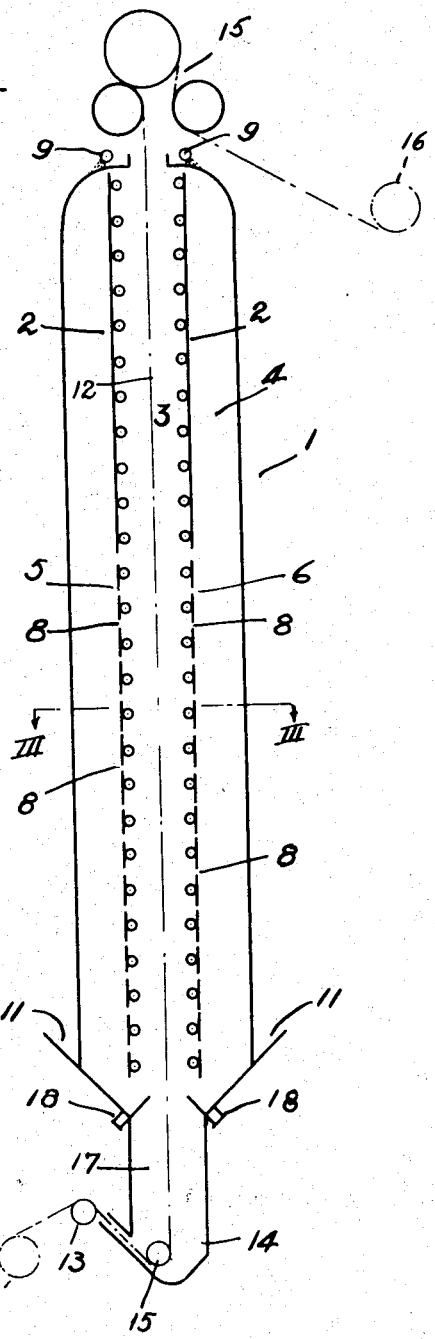
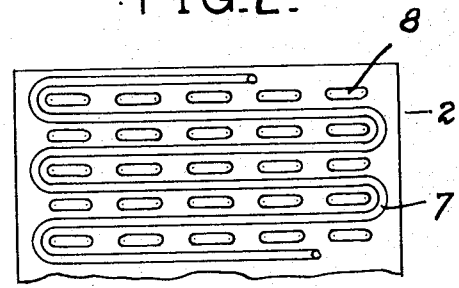
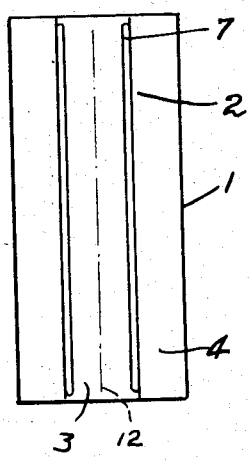
INVENTOR
ADOLPH ZIMMERLI
BY
ATTORNEY

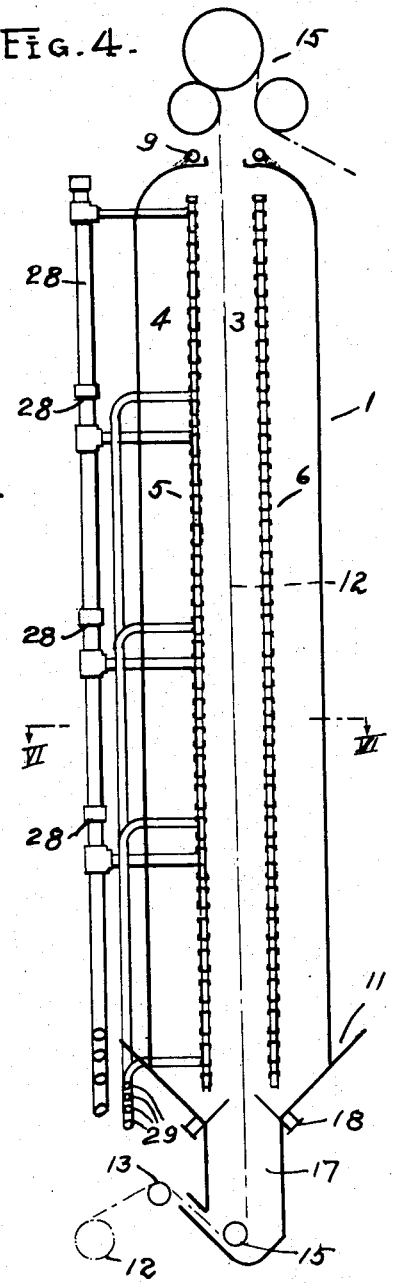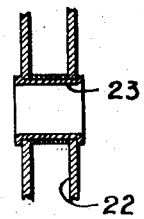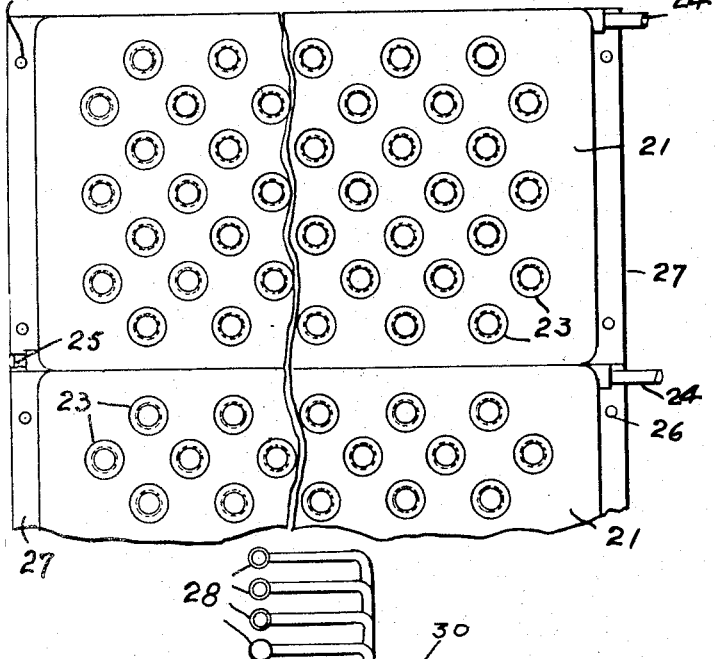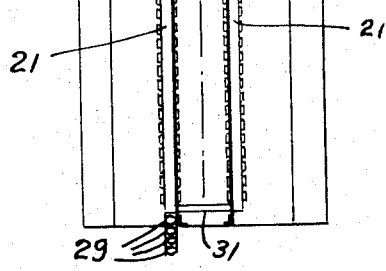

Patented Jan. 4, 1927.

1,613,073

UNITED STATES PATENT OFFICE.

ADOLPH ZIMMERLI, OF NEW BRUNSWICK, NEW JERSEY, ASSIGNOR TO CELLO PRODUCTS INCORPORATED, A CORPORATION OF NEW YORK.

SOLVENT-RECOVERY APPARATUS.

Application filed December 17, 1923. Serial No. 681,217.

The recovery of volatile solvents forms an important problem in numerous industries: for example in the manufacture of artificial leather, glass substitutes, rubberized fabric, lacquered and varnished goods, where such solvents as benzene, gasoline, alcohol, acetone, methylacetate, and numerous other solvents and mixtures thereof are employed. All those solvents are inflammable, more or less toxic and expensive. From all these standpoints, their recovery is highly desirable.

Numerous devices have heretofore been proposed for the recovery of volatile solvents or fluids but the functioning of most of these devices depend upon the coated articles or materials passing through a heated zone in which the heat is supplied by convection, the most common method being circulating a gas, such as warm air, and bringing it into contact with articles or materials. The solvent entrained or carried away with the gas is recovered either by cooling or absorption and distillation. In order to prevent losses of the solvent the apparatus employed must be air tight, thereby necessitating complicated installations.

It is an object of the present invention to provide a solvent recovery apparatus of simplified construction, efficient and economical to operate.

Another object is the provision of apparatus for recovering solvents dependent for its operation upon heat supplied by radiation instead of convection.

Another object of the invention is the provision of a solvent recovery apparatus comprised of a plurality of compartments, one of which comprises a heating chamber having a series of heating coils or elements adapted to be heated separately, and another compartment designed to function as a cooling or condensing chamber.

A further object is the provision of an apparatus adapted to permit the coating and drying of articles passed therethrough, the process being carried out continuously.

A still further object of the invention is the provision of a process for recovering volatile solvents without the use of air or other gas, thus making it unnecessary to employ an apparatus which is air tight.

In accordance with my invention there is provided an enclosure divided vertically into preferably two compartments or chambers. The inner chamber is open to the atmosphere at the top thereof and may be formed by partition walls composed of sheet asbestos upon the adjacent surfaces of which are supported heating coils or elements. The heating elements may be of such a character as to comprise the partitions. In such an event these elements may comprise hollow sections, each of which are constructed somewhat in the manner of a steam boiler, except being flat and rectangular in shape and adapted to fit one upon another. Each of these several sections may be heated independently and in practice would be heated to progressive temperatures, the lower-most one being heated to the highest temperature. The outer chamber has its exterior surfaces cooled in any suitable manner and is placed in communication with the inner chamber by means of slots or openings made in the partitioning walls separating the said chambers from each other.

An arrangement is provided for the passage of coated articles or materials through the heating chamber, the movement of the articles or materials being in an upward direction, when emerging from the coating material, and in fairly close proximity to the heating coils or elements. The length of the passage-way is sufficient to permit the evaporation of the solvent before the coated objects or materials leave the heating chamber. Suitable means are provided for cooling the outer walls of the condensing chamber and collecting the solvent when condensed. The operation of the apparatus permits of the continuous passage of coated articles or materials therethrough.

Referring to the accompanying drawings:

Figure 1 illustrates diagrammatically a vertical sectional view of an apparatus embodying my invention;

Figure 2 is a fragmentary elevation of the inner surface of the partitioning walls supporting the heating units;

Figure 3 is a transverse section of the apparatus taken on lines III—III of Figure 1;

Figure 4 is a view similar to Figure 1, showing a modification of the partitioning walls and heating units employed;

Figure 5 is an enlarged elevational view of the modified heating units;

Figure 6 is a transverse section of the form of apparatus shown in Figure 4 and taken on lines VI—VI thereof;

Figure 7 is a plan or end view of one of the heating units shown in Figure 5; and Figure 8 is an enlarged detailed sectional view showing one of the openings in the plate or sections constituting the partitioning walls forming the separate compartments.

For the sake of convenience, I have illustrated an apparatus embodying my invention which is adapted especially to the coating of fabrics and the like. Referring to the drawings the apparatus shown therein may comprise an enclosure 1 divided vertically by partitioning walls 2, forming an inner or heating chamber 3 and an outer or condensing chamber 4. The partitioning walls 2 may comprise a heat insulating material such as asbestos board lined upon its inner surface with sheet iron. Suitably supported upon the inner surface of the partitioning walls 2 are oppositely disposed heating units 5 and 6. These units may comprise coils 7 (see Figs. 1 to 3) the turns or sections of which are spaced as closely together as possible and preferably formed of half inch pipe secured in any approved manner to the partitioning walls 2. Openings 8 are formed intermediate the several turns of the heating coils 7, thus affording passage ways for placing the chambers 3 and 4 into communication with each other.

The enclosure may be made from sheet metal with the upper end of the side walls converging in such a manner that the opening at the top of said enclosure is constricted although remaining open to the atmosphere. The outer surfaces of the side walls of the enclosure 1 are cooled by means of water sprays 9, mounted at the top thereof and adapted to play water thereon, which by force of gravity flows downwardly until collected in troughs 11 formed at the bottom of the enclosure from whence the water may be drawn off. The height of the enclosure 1 is so calculated that all of the solvent is evaporated before the coated object reaches the top thereof. Since the top of the enclosure 1 is partially opened to the atmosphere, the air within the enclosure will be displaced by the vapors of the solvent, without mixing therewith to any extent, since the specific gravity of the vapors of all volatile solvents, such as mentioned above and in commercial use, is considerably higher than that of air at the same temperature; such vapors even at temperatures considerably above their boiling point are heavier than cold air. In calculating the height of enclosure 1, consideration should be given to such factors as the speed at which the objects are caused to travel through the inner or heating chamber 3, the temperature to which the coils 7 are heated, the character of the coating material, etc. All such factors, however, can be more or less roughly estimated inasmuch as it is only essential to accomplish the purposes in view that the height of the enclosure 1 be such that the solvent is substantially all vaporized before the coated object leaves the heating chamber 3 and at the same time avoid the premature drying or setting of the coating formed thereon.

I have found it convenient to employ steam heating units and discovered that it is sometimes desirable to have the same composed of a plurality of sections which may be heated separately or independently of each other. This form of construction will hereinafter be more fully described with respect to Figs. 4 to 8, but the main features thereof are obviously applicable to the coil type heating units. The spacing of the heating units is such that the coated objects passing therebetween is in sufficient proximity thereto that the radiated heat therefrom effectively vaporizes the solvent from the coating material on said objects. It is obvious that the hotter the heating units are maintained the more rapid the evaporation of the solvent, which permits greater rapidity of movement of the coated objects through the apparatus. Care should be exercised, however, not to prematurely cause the setting of the coating material, particularly the outer surface thereof, as undesirable results may follow. Consideration should also be given to the speed of the coated article through the apparatus inasmuch as if it moves too slowly past the lower sections premature setting of the coating take place. Further, if the lower heating sections or units are maintained at too high temperatures, the hot vapors have a tendency to rise rapidly, thereby causing currents which it is desired to avoid.

The modifications shown in Figs. 4 to 8 relate principally to changes in the construction of the heating units 5 and 6. In this form of my apparatus the heating units are each composed of a plurality of sections 21. These several sections are composed of a pair of closely spaced rectangular plates 22 united by side and end walls formed at the edges of said plates. The plates 22 are perforated by oppositely disposed openings into which are fitted hollow steam tight connector members 23 which resemble in construction and appearance miniature boiler tubes of a steam boiler. The function of the connector members 23 is to provide means of communication between the heating chamber 3 and the condensing chamber 4. All of the sections 21 are provided with an inlet and an outlet connection 24 and 25, respectively, and are adapted to be fitted edgewise longitudinally one upon another, and secured to upright supporting members (not shown) in any suitable manner, as, for example, by passing bolts through holes 26 made in the marginal flanged edges 27. The dimensions of the sections 21 as to width and height are such that when properly mounted within the enclosure 1 a given number of said sections form partitioning walls for dividing the enclosure into the two compartments comprising the heating chamber 3 and condensing chamber 4.

A separate steam riser or pipe 28 is furnished for each of the inlet connections 24 and a separate return pipe 29 for the outlet connections 25. It will be noted that the heating sections 21 which are oppositely disposed are so connected by pipes 30 and 31 as to have a common inlet pipe 28 and a common outlet pipe 29. By using different steam pressures in the several pipes 28 it is possible to heat the sections 21 to different temperatures which may be progressively greater upwardly, i. e., the lowermost section would be heated the hottest. It is to be appreciated, however, that although this section would normally be the hottest but because of the great absorption of heat by the solvent vapors at this region of the enclosure 1, the internal temperature of the heating chamber may not vary widely throughout its length. In order to increase the efficiency of the condensing chamber 4 the outer surface (inner surface with respect to said chamber) of the sections 21 may be lined with heat insulating material such as asbestos board (not shown). In such an event, the lining material should be provided with apertures corresponding in size and position to the tubes or connectors 23, so as not to block the passageways between the chambers 3 and 4.

The operation of the apparatus illustrated in the drawings and described above is as follows: A roll 12 of the fabric material is suitably supported at the base of the apparatus and the material is lead over an idle roller 13, through an aperture formed near the bottom of a container 14 holding the coating substance. The fabric is then passed under an idle roller 15 which is submerged in the coating material, thence through the heating chamber 3, through a set of rollers 15 mounted above the opening at the top of the enclosure 1, and finally wound upon a power driven receiving roller 16. As the fabric passes through the apparatus, moving in an upward direction, it it first immersed in the coating material and then immediately passes through a saturation chamber 17 formed intermediate the lower extremity of the enclosure 1 and the container 14. Any excess of the coating material adhering to the fabric flows back into the container 1, and the saturation chamber 17 being full of the solvent vapor evaporation therein takes place slowly or to no appreciable extent.

From the saturation chamber the fabric passes into the heating chamber 3 which is maintained at such a temperature that the solvent is volatilized from the coating substance before the fabric leaves the enclosure, evaporation taking place immediately upon entrance of the fabric and continuing until the solvent is completely evaporated. In the event the heating units are separate the temperatures thereof may be regulated so as to be progressively greater upwardly, in which event more rapid, and perhaps complete, volatilization of the solvent may be effected. The solvent vapors escape through the openings 8 in the partitioning walls into the condensing or outer chamber 4. The solvent vapors contacting with the cooled surfaces of the chamber 4 are condensed and collected in the bottom thereof. These vapors being heavier than air and their total volume being kept substantially constant by condensing the excess thereof, but small loss is occasioned by the escape of the solvent vapors through the top of the enclosure 1. The condensed vapors may be recovered by being drawn off through pipes 18.

From the foregoing it is obvious that the process of coating objects may be carried out continuously with my apparatus and uniform results obtained as to the quality of the product secured therefrom.

Certain modifications of my invention will suggest themselves to those skilled in the art, but I wish to be understood as contemplating such modifications as come within the scope of the appended claims.

What is claimed is:

1. A solvent recovery apparatus comprising an enclosure divided vertically by partitioning walls into an inner and an outer chamber, means for heating said inner chamber by radiant heat, means for cooling said outer chamber, means for placing said chambers in communication with each other and means for passing a coated material through said inner chamber, whereby the solvent of the coating substance may be volatilized and condensed in the outer chamber.

2. A solvent recovery apparatus comprising an enclosure divided vertically by partitioning walls into an inner and an outer chamber, means for heating said inner chamber by radiant heat, means for cooling said outer chamber, means for placing said chambers in communication with each other, means for preventing the escape of a volatile solvent and means for passing a coated material through said inner chamber, whereby the solvent of the coating substance may be volatilized and condensed in the outer chamber.

3. A solvent recovery apparatus comprising an enclosure divided vertically by partitioning walls into an inner and an outer chamber, means for heating said inner chamber by radiant heat, means for cooling said outer chamber, means for placing said chambers in communication with each other, means for preventing the escape of a volatile solvent, and means for passing a coated material through said inner chamber, the passage of said material being in an upward direction, whereby the solvent of the coating substance may be volatilized and condensed in the outer chamber.

4. A solvent recovery apparatus comprising an enclosure divided vertically by partitioning walls into an inner and an outer chamber, heating elements for heating said inner chamber by radiant heat, said elements being adapted to have a temperature gradient, means for cooling said outer chamber, means for placing said chambers in communication with each other, said inner chamber being opened to the atmosphere at the top thereof and of sufficient length that the solvent vapors are kept below a layer of air, and means for passing a coated material through said inner chamber, whereby the solvent of the coating substance may be volatilized and condensed in the condensing chamber.

5. A solvent recovery apparatus comprising an enclosure divided vertically by partitioning walls into an inner and an outer chamber, heating elements for heating said inner chamber by radiant heat, said elements being adapted to have a temperature gradient, means for cooling said outer chamber, means for placing said chambers in communication with each other, said inner chamber being opened to the atmosphere at the top thereof and of sufficient length that the solvent vapors are kept below a layer of air, and means for passing a coated material through said inner chamber, the travel of said material being upwardly and at such a rate of speed as to permit the coating thereon to be fixed before becoming exposed to the atmosphere, whereby the solvent of the coating substance may be volatilized and condensed in the condensing chamber.

6. A solvent recovery apparatus comprising an enclosure divided vertically by partitioning walls into an inner and an outer chamber, heating elements for heating said inner chamber by radiant heat, said elements being adapted to have a temperature gradient, means for cooling said outer chamber, openings formed in said partitioning walls for placing said chambers in communication with each other, said inner chamber being opened to the atmosphere at the top thereof and of sufficient length that the solvent vapors are kept below a layer of air and the mixing of the two layers is reduced to a minimum, and means for passing a coated material through said inner chamber, the travel of said material being upwardly and at such a rate of speed as to permit the coating thereon to be fixed before becoming exposed to the atmosphere, whereby the solvent of the coating substance may be volatilized and condensed in the condensing chamber.

7. The process of recovering volatile solvents from a coating material applied to an object, which comprises passing a coated object in close proximity to a source of radiant heat to effect the vaporization of the solvents from said coating material, moving the object in an upward direction and condensing and collecting the solvent vapors.

8. The process of recovering volatile solvents from a coating material applied to an object, which comprises passing a coated object in close proximity to a source of radiant heat supplied by treating units adapted to have a temperature gradient.

9. The process of recovering volatile solvents from a coating material applied to an object, which comprises passing a coated object in close proximity to a source of radiant heat to effect the vaporization of the solvents from said coating material, moving the object in an upward direction, maintaining the solvent vapors below a layer of air during the condensation thereof and collecting the condensate progressively greater in a given direction.

In testimony whereof, I have hereunto subscribed my name this 13th day of December, 1923.

ADOLPH ZIMMERLI.